United States Patent
Padiou et al.

(10) Patent No.: US 11,940,673 B2
(45) Date of Patent: Mar. 26, 2024

(54) DETERMINING METHOD FOR AN OPHTHALMIC LENS WITH OPTIMIZED THICKNESS

(71) Applicant: Essilor International, Charenton-le-Pont (FR)

(72) Inventors: Jean-Marc Padiou, Charenton-le-Pont (FR); Mathieu Feuillade, Charenton-le-Pont (FR); Alexandre Gourraud, Charenton-le-Pont (FR); Loïc Quere, Charenton-le-Pont (FR); Olivier Roussel, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 523 days.

(21) Appl. No.: 16/770,421

(22) PCT Filed: Dec. 5, 2018

(86) PCT No.: PCT/EP2018/083688
§ 371 (c)(1),
(2) Date: Jun. 5, 2020

(87) PCT Pub. No.: WO2019/110683
PCT Pub. Date: Jun. 13, 2019

(65) Prior Publication Data
US 2020/0387008 A1      Dec. 10, 2020

(30) Foreign Application Priority Data
Dec. 6, 2017   (EP) .................................... 17306710

(51) Int. Cl.
*G02C 7/02* (2006.01)
*B29D 11/00* (2006.01)
*B33Y 80/00* (2015.01)

(52) U.S. Cl.
CPC ........ *G02C 7/027* (2013.01); *B29D 11/00432* (2013.01); *B33Y 80/00* (2014.12); *G02C 2202/16* (2013.01)

(58) Field of Classification Search
CPC ...... G02C 2202/16; G02C 7/02; G02C 7/027; G02C 7/024; G02C 7/025; G02C 7/06;
(Continued)

(56) References Cited

U.S. PATENT DOCUMENTS 4,573,121 A    2/1986   Saigo et al.
8,840,246 B2   9/2014   Lafon et al.
(Continued)

FOREIGN PATENT DOCUMENTS

EP    2343154 A1    7/2011
EP    2 878 989 A1  6/2015
(Continued)

OTHER PUBLICATIONS

International Search Report and Written Opinion, dated Jan. 17, 2019, from corresponding PCT application No. PCT/EP2018/083688.
(Continued)

*Primary Examiner* — Travis S Fissel
(74) *Attorney, Agent, or Firm* — NIXON & VANDERHYE

(57) ABSTRACT

A method of determining at least one parameter of an ophthalmic lens (40) including a complementary optical element (12) obtained by additive manufacturing and configured to provide at least a part of the optical function of the ophthalmic lens, the determining method including a step of providing two characterizing surfaces simulating two opposite surfaces of a complementary optical element (12), the distance between the two characterizing surfaces along a thickness axis (Z) defining the thickness of the complemen-
(Continued)

tary optical element; a step of optimizing the distance between the two characterizing surfaces (20) along the thickness axis (Z) so that the thickness of the complementary optical element reaches a thickness threshold while complying with the optical function of the ophthalmic lens (40); and a step of determining at least one parameter of the ophthalmic lens (40) on the basis of the optimized distance.

19 Claims, 3 Drawing Sheets

(58) Field of Classification Search
CPC ........ G02C 7/061; G02C 7/063; G02C 7/065; G02C 7/068; B33Y 80/00; B29D 11/00432
USPC ............. 351/159.01, 41–158, 159.4–159.48, 351/159.52–159.62, 159.7–159.77
See application file for complete search history.

(56) References Cited

U.S. PATENT DOCUMENTS

| | | | |
|---|---|---|---|
| 2003/0107705 A1 | 6/2003 | Zimmermann et al. | |
| 2005/0046957 A1 | 3/2005 | Lai et al. | |
| 2006/0073771 A1 | 4/2006 | Mandler et al. | |
| 2015/0241714 A1 | 8/2015 | Allione et al. | |
| 2016/0059373 A1 | 3/2016 | Daimaru et al. | |
| 2016/0091733 A1* | 3/2016 | Moine | G02C 7/024 351/159.75 |
| 2016/0101573 A1* | 4/2016 | Quere | B29D 11/00961 425/166 |
| 2016/0114542 A1* | 4/2016 | Quere | B33Y 10/00 425/104 |
| 2016/0161761 A1* | 6/2016 | Quere | G02C 7/027 427/164 |
| 2016/0311184 A1 | 10/2016 | Gourraud | |
| 2017/0199395 A1 | 7/2017 | Baudart et al. | |

FOREIGN PATENT DOCUMENTS

| | | | | |
|---|---|---|---|---|
| EP | 2979813 A1 | 2/2016 | | |
| WO | WO-2014177386 A1 * | 11/2014 | ....... | B29D 11/00961 |

OTHER PUBLICATIONS

Office Action issued in European Patent Application No. 18 814 594.0 dated Mar. 15, 2021.

Office Action issued in European Patent Application No. 18 814 594.0 dated Feb. 8, 2023.

* cited by examiner

DETERMINING METHOD FOR AN OPHTHALMIC LENS WITH OPTIMIZED THICKNESS

The invention relates to the field of the manufacture of ophthalmic lenses obtained at least partly by additive manufacturing. More particularly, the invention relates to a method of determining at least one parameter of an ophthalmic lens having at least one optical function.

BACKGROUND OF THE INVENTION

Methods for manufacturing ophthalmic lenses with a complementary optical element obtained by additive manufacturing are known. This complementary optical element is intended to be disposed onto a starting optical system to form an ophthalmic lens.

With additive manufacturing methods, the complementary optical element is formed by the deposition of a plurality of predetermined volumes of material. Particularly, the complementary optical element is generated by adding thin layers of material one on top of the other. This operation is time consuming. Furthermore, the more interface the ophthalmic lens has, the more there will be a risk of weakness in the ophthalmic lens during the following manufacturing steps, as the step of edging the ophthalmic lens when it is mounted in a frame. Indeed, vibrations or humidity may involve a delamination of the ophthalmic lens.

It was also observed that material used for additive manufacturing may not be totally optically clear (haze) or may present a yellow transmission due to ultraviolet absorbers. Furthermore, in some cases, the complementary optical element does not cover the entire surface of the starting optical system, i.e. there is no additional layer on the starting optical system. In these cases, discontinuities may be visible, especially when there is a difference of transmission or reflection properties between the complementary optical element material and the starting optical system. These discontinuities may lead to difficulties for coating the ophthalmic lens, for example with hard coating.

Moreover, it is generally desirable to have a thin ophthalmic lens. However, it is difficult to obtain a thin starting optical system because injection or casting is complex, and starting optical system would not have accurate surfaces or unstable shape over time. Therefore, it is difficult to perform an accurate ophthalmic lens thickness optimization, especially when the complementary optical element is directly manufactured onto the starting optical system. These difficulties increase when the absolute power of the ophthalmic is decreased, i.e. when thickness at the center of the lens is increased for myopia or when edge thickness is increased for hyperopia.

SUMMARY OF THE INVENTION

A problem that the invention aims to solve is thus to provide an improved method allowing to manufacture a thinner ophthalmic lens with a complementary optical element obtained by additive manufacturing, that reduces interfaces and discontinuities in the ophthalmic lens while reducing the time to manufacture the ophthalmic lens.

To solve this problem, the invention provides a method of determining at least one parameter of an ophthalmic lens having at least one optical function, the ophthalmic lens comprising a starting optical system and a complementary optical element intended to be disposed onto the starting optical system, the complementary optical element being obtained by additive manufacturing and configured to provide at least a part of the optical function of the ophthalmic lens, the determining method comprising:
- a step of providing two characterizing surfaces simulating two opposite surfaces of the complementary optical element, a thickness axis of the complementary optical element being defined perpendicular to one of the two characterizing surfaces, the distance between the two characterizing surfaces along said thickness axis defining the thickness of the complementary optical element,
- a step of optimizing the distance between the two characterizing surfaces along the thickness axis so that the thickness of the complementary optical element reaches a thickness threshold while complying with the optical function of the ophthalmic lens, and
- a step of determining at least one parameter of the ophthalmic lens on the basis of said optimized distance.

Determining at least one parameter of the ophthalmic lens depending on an optimized thickness of the complementary optical element allows to optimize the additive manufacturing of the complementary optical element so as to minimize the layers of material forming thereof. It is important to note that the thickness is optimized while ensuring that the optical function of the ophthalmic is obtained.

This determining method thus allows to optimize the number of layers and their size to get the minimal volume of material, while complying with the optical function of the ophthalmic lens. Therefore, the interfaces and discontinuities in the ophthalmic lens are decreased.

Furthermore, reducing the number of layers and the volume material to obtain an ophthalmic lens with a desired optical function allows to speed up the process. Another advantage of such an optimization is that minimizing the thickness of the layers allows to maintain optical quality of the complementary optical element because it reduces the risks of haze/yellowish effects.

According to an embodiment of the determining method, it also comprises:
- a step of providing a desired lens contour,
- a step of determining one point in the desired lens contour where the thickness of the complementary optical element along the thickness axis has the minimum value within said contour,
- during the optimizing step, the distance between the two characterizing surfaces along the thickness axis being optimized so that the thickness of the complementary optical element at said point reaches the thickness threshold while complying with the optical function of the ophthalmic lens.

According to an embodiment of the determining method, the ophthalmic lens is intended to be mounted within an opening of a frame, the desired lens contour being defined to match the opening.

According to an embodiment of the determining method, the ophthalmic lens is intended to be mounted in an opening of a frame, the desired lens contour being defined to be larger than the opening.

According to an embodiment of the determining method, one of the two characterizing surfaces defines an outer surface of the starting optical system on which the complementary optical element is intended to be deposited, the other characterizing surface defining an external boundary surface of the complementary optical element.

According to an embodiment of the determining method, the optimizing step forms a loop comprising:

a step of varying the distance between the two characterizing surfaces, a step of determining if the thickness of the complementary optical element has reached the thickness threshold, the loop being repeated until the thickness threshold is reached.

According to an embodiment of the determining method, the thickness threshold is a thickness range, the optimizing step comprising a step of determining if the thickness of the complementary optical element is within the thickness range.

According to an embodiment of the determining method, the thickness range is set between 0 μm and 150 μm, preferably between 10 μm and 100 μm, more preferably between 20 μm and 50 μm.

According to an embodiment of the determining method, it further comprises a step of determining said two characterizing surfaces depending on measurements taken on a user or on at least one picture of the user.

The invention also provides a method of manufacturing an ophthalmic lens having at least one optical function, comprising:

a step of determining at least one parameter of the ophthalmic lens according to the method as described above, a step of additively manufacturing the complementary optical element according to the at least one determined parameter with an optimized thickness by depositing a plurality of predetermined volume elements on a predetermined build support, the complementary optical element being configured to provide at least a part of the optical function of the ophthalmic lens.

According to an embodiment of the manufacturing method, the additively manufacturing step to manufacture the complementary optical element is one among polymer jetting and stereolithography.

According to an embodiment of the manufacturing method, the build support is a starting optical system.

According to an embodiment of the manufacturing method, it further comprises a step of assembling the complementary optical element to a starting optical system to obtain the ophthalmic lens.

The Invention further provides an ophthalmic lens having at least one optical function, the ophthalmic lens being obtained by the manufacturing method as described above, the ophthalmic lens comprising:

a starting optical system;

a complementary optical element onto a surface of the starting optical system, the complementary optical element providing at least a part of the optical function of the ophthalmic lens, wherein the complementary optical element is obtained by additive manufacturing by depositing a plurality of predetermined volume elements on a predetermined build support, wherein the complementary optical element has at least one area having an optimized thickness value below or equal to 150 μm, preferably to 100 μm, more preferably to 50 μm.

According to an embodiment of the ophthalmic lens, the starting optical system comprises a first surface intended to face an eye of a user when the ophthalmic lens is mounted on a frame worn by the user, and a second surface opposite to the first surface, the complementary optical element being disposed on either the first or the second surfaces of the starting optical system

BRIEF DESCRIPTION OF THE DRAWINGS

The invention is described in more detail below by way of the figures that show only one preferred embodiment of the invention.

DETAILED DESCRIPTION OF THE PREFERRED EMBODIMENTS

Figure 1:
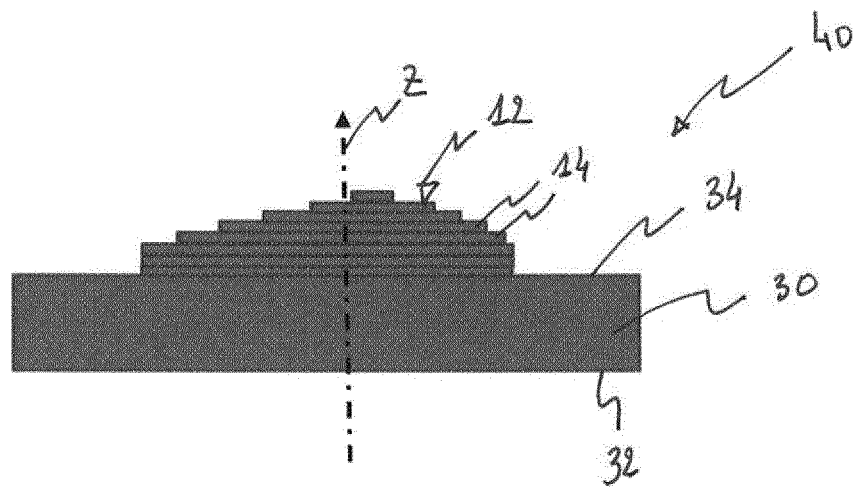
FIG. 1 schematically shows an ophthalmic lens comprising a complementary optical element obtained by the deposition of predetermined volumes on a starting optical system.

As shown on FIG. 1, an ophthalmic lens 40 having at least one optical function is provided. The ophthalmic lens 40 comprises a starting optical system 30 and a complementary optical element 12 intended to be disposed onto the starting optical system 30. The complementary optical element 12 provides at least a part of the optical function of the ophthalmic lens 40.

It will be recalled that the optical function of a lens, of a system or of an optical element means the optical response of this lens or of this system or of this element, namely a function that defines any modification in the propagation and transmission of an optical beam through the lens, the system or the optical element concerned, whatever the angle of incidence of the incident optical beam and whatever the geometric extent of an input diopter illuminated by the incident optical beam. Said at least one optical function may be simple or complex.

More specifically, in the field of ophthalmics, the optical function is defined as the distribution of wearer power and astigmatism characteristics and of higher-order aberrations associated with the lens, with the system or with the optical element for all the directions of gaze of a wearer of this lens, of this system or of this element. That of course assumes that the geometric positioning of the lens, of the system or of the optical element with respect to the eye of the wearer has been predetermined.

It will also be noted that the wearer power is a way of calculating and of adjusting the power of the ophthalmic lens, which differs from the focimetric power. Calculating the wearer power ensures that the power perceived by the wearer (i.e. the power of the beam of light that enters the eye) once the lens is positioned in the frame and worn by the wearer, corresponds to the prescribed power. In general, at any point on the lens, notably at the points at which distance vision and close vision are checked, for a varifocal lens, the power measured with a lensmeter differs from the wearer power. However, the wearer power at the optical center of a single-focus lens is generally close to the power observed with a lensmeter positioned at this point.

The complementary optical element 12 is obtained by a step of additively manufacturing the complementary optical element 12 by depositing a plurality of predetermined volume elements 14 directly on the starting optical system 12 or on a build support (not shown) and then transferred on the starting optical system 30. In this latter case, an additional step of assembling the complementary optical element 12 to the starting optical system 30 is performed to obtain the ophthalmic lens 40. The complementary optical element 12 is formed by the plurality of predetermined volume elements 14 which are juxtaposed and superposed to form a plurality of superposed layers of a material.

It will be noted that additive manufacturing here corresponds to a three-dimensional printing or stereolithography method, or even to a method of fused filament fabrication. Preferably, the additive manufacture is one among polymer jetting and stereolithography.

On FIG. 1, the complementary optical element 12 has a curved, more specifically convex, front side and a planar back side. Depending on the desired optical function of the ophthalmic lens 40, the front and back sides of the complementary optical element 12 may be each planar or curved. Shape of the complementary optical element 12, or predetermined profile 16, is determined depending on the desired optical function of the ophthalmic lens 40. In this instance, "planar" does not necessarily mean "smooth" and does not necessarily exclude the presence of roughness. Furthermore, "planar" surface means that this surface has a curvature close to zero.

The starting optical system 30 may have an initial optical function. It will be noted that it is chiefly the complementary optical element 12 which confers the optical function on the ophthalmic lens 40, even if the starting optical system 30 already has a simple or complex optical function. In other words, without this complementary optical element 12, the ophthalmic lens 40 cannot exhibit the optical function prescribed for it. This complementary optical element 12 therefore has nothing to do with a simple surface coating, such as an antireflective coating, an antifog coating, a scratchproof coating or even a dirt-resistant coating.

This starting optical system 30 is preferably made of a material generally used for the manufacture of ophthalmic lens, such as the allylic polymer known by the name CR39. The starting optical system 30 may also be made of polycarbonate. The starting optical system 30 may be manufactured by casting, injection, surfacing or by additive manufacturing.

The starting optical system 30 is preferably a thin lens which power is closed to the planned Rx. Particularly, the starting optical system 30 has a local thickness which is higher than 0.3 mm and preferably higher than 0.5 mm. The starting optical system 30 may be spherical, torical or progressive. Depending on the desired optical function, front and back sides of the starting optical system 30 may be each planar or curved.

The starting optical system 30 comprises a first surface 32 intended to face an eye of a user when the ophthalmic lens 40 is mounted on a frame (not shown) worn by the user, and a second surface 34 opposite to the first surface 32. On FIG. 1, the complementary optical element 12 is disposed on the second surface 34. More generally, the complementary optical element 12 is disposed on either the first or the second surfaces of the starting optical system 30. Access to front side of the starting optical system 30 is easier but, for aesthetical or practical reasons, it should be preferred to put the complementary optical element 12 on the back side. Particularly, the complementary optical element 12 is preferably disposed on the back side of the starting optical system 30 when the complementary optical element 12 brings a cylinder component to the ophthalmic lens 40, when the starting optical system 30 has added values on the front side (for example anti-adhesive properties) or when the complementary optical element 12 presents risks of damage (e.g. scratches). On the other hand, it is preferred to dispose the complementary optical element 12 on the front side if this complementary optical element 12 brings front added values to the ophthalmic lens 40.

A method of determining at least one parameter of said ophthalmic lens 40 is provided. The determining method is preferably a computer implemented method for determining said at least one parameter so as to manufacture the ophthalmic lens 40 depending on said at least one parameter. Such a manufacturing method is also provided. A further aspect of the invention is to provide a method of manufacturing an ophthalmic lens 40 comprising the determination of said at least one parameter of said ophthalmic lens 40 and a step of additively manufacturing the complementary optical element 12 according to said at least one determined parameter with an optimized thickness.

Figure 2:
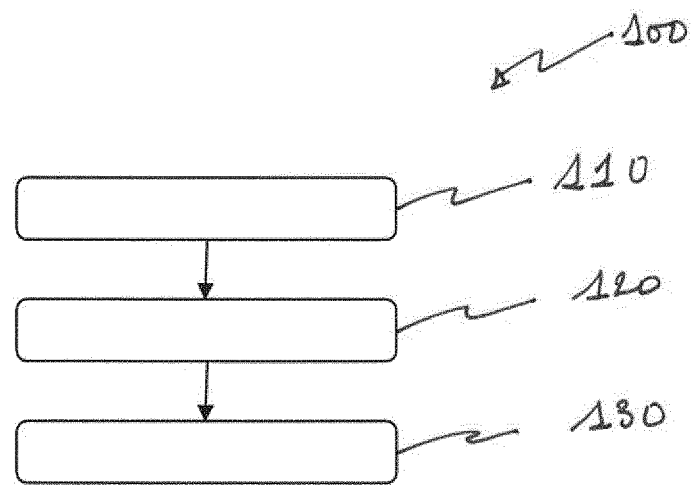
FIG. 2 schematically shows various steps of a method of determining at least one parameter of an ophthalmic lens comprising an optimizing step.
Figure 3:
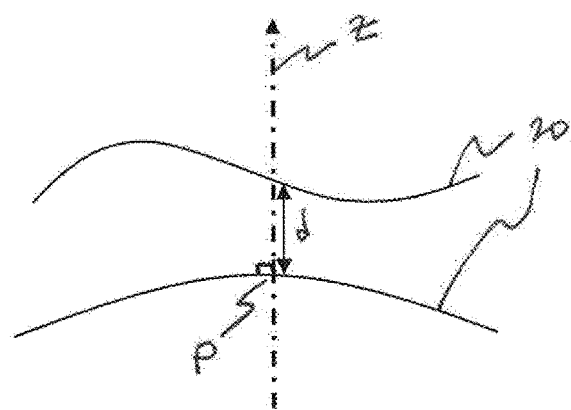
FIG. 3 shows two characterizing surfaces simulating two opposite surfaces of the complementary optical element of FIG. 1.

Steps of the determining method are shown in a diagram on FIG. 2 and illustrated on FIG. 3. The determining method comprises a step of providing 110 two characterizing surfaces 20 simulating two opposite surfaces of the complementary optical element 12. A thickness axis Z of the complementary optical element 12 is defined perpendicular to one of the two characterizing surfaces 20 at a reference point P of that surface. The distance d between the two characterizing surfaces 20 along said thickness axis Z defines the thickness of the complementary optical element 12. Preferably, one of the two characterizing surfaces 20 defines an outer surface of the starting optical system 30 on which the complementary optical element 12 is intended to be deposited. In this case, the other characterizing surface 20 defines an external boundary surface of the complementary optical element 12. Shape and position of the two characterizing surfaces depend on the desired optical function of the ophthalmic lens 40 and of the geometry and shape of the starting optical system 30.

The determining method further comprises a step of optimizing 120 the distance d between the two characterizing surfaces 20 along the thickness axis Z. This optimization is performed so that the thickness of the complementary optical element 12 reaches a thickness threshold. In other words, the distance d is varied to make the thickness of the complementary optical element 12 comply with a thickness criterion. The thickness threshold preferably depends on the thickness of the volume elements 14 forming the complementary optical element 12. Indeed, it is advantageous that the optimized thickness of the complementary optical element 12 match with a layer thickness that an additive manufacturing machine is able to produce. The thickness threshold is for example a minimum thickness threshold. Alternatively or in combination, the thickness threshold may be a thickness range. In this latter case, the criterion is considered as fulfilled when the thickness of the complementary optical element 12 is within the thickness range. Preferably, the thickness range is set between 0 µm and 150 µm, preferably between 10 µm and 100 µm, more preferably between 20 µm and 50 µm.

This optimization of the distance d is also performed to comply with the optical function of the ophthalmic lens 40. Thus, the distance d is optimized depending on at least two parameters: a thickness threshold and the compliance with the desired optical function of the ophthalmic lens 40.

Then, the determining method comprises a step of determining 130 at least one parameter of the ophthalmic lens 40 on the basis of said optimized distance d. Said at least one parameter may be the shape, the position or the orientation of at least one of the two characterizing surfaces at a single point or at multiple points of these surfaces when the distance d is optimized after the optimizing step 120. Therefore, it is possible to reduce the number and the thickness of the layers forming the complementary optical element 12 while ensuring that the desired optical function of the ophthalmic lens 40 is obtained.

Figure 5:
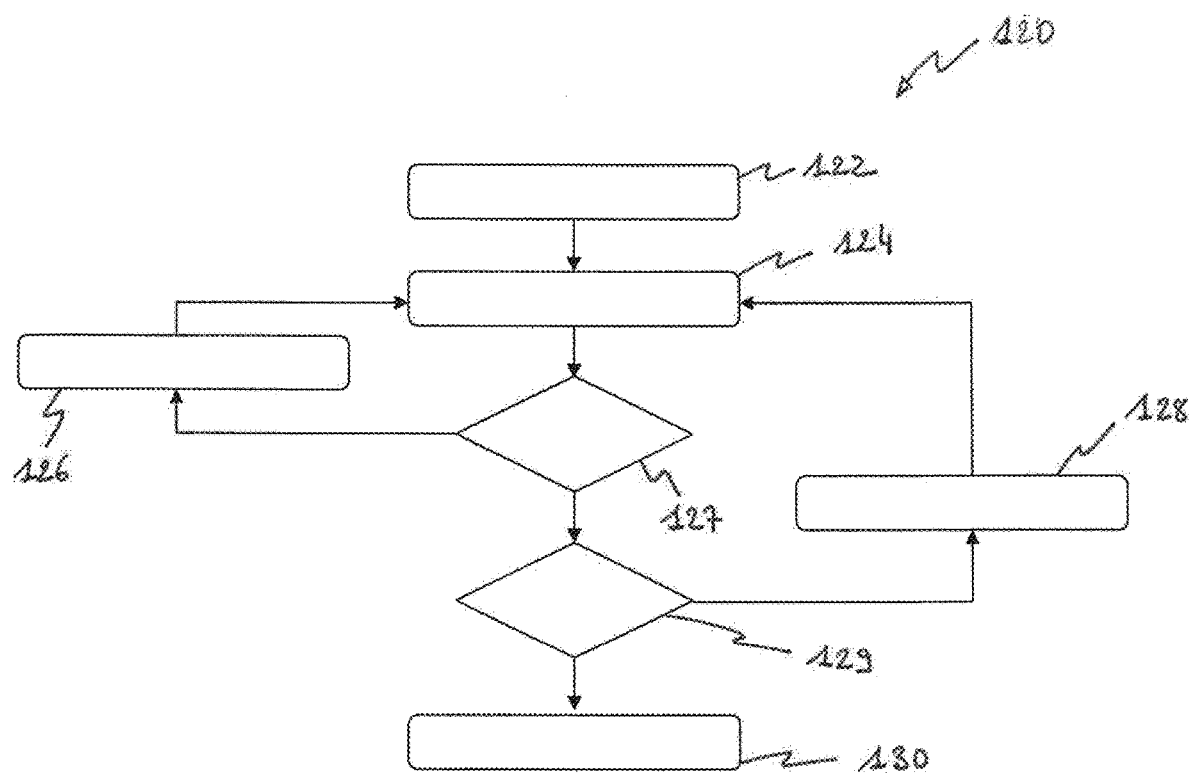
FIG. 5 schematically shows an embodiment of the optimizing step of FIG. 2.

The determining method may also comprise a step of providing a desired lens contour 50, as shown on FIG. 5. The desired lens contour 50 corresponds to a functional area into which the complementary optical element 12 is optimized. The desired lens contour 50 may be measured on the frame. When the ophthalmic lens 40 is intended to be mounted within an opening of a frame, the desired lens contour 50 may be defined to match the opening. In this case, the desired lens contour may be slightly smaller than the opening (for example 0.2 to 0.5 mm). Alternatively, the desired lens contour 50 may be defined to be larger than the opening. For example, it may be a geometric shape which circumscribes the frame opening shape. Preferably the geometric shape is a circle or an ellipse or a polygon.

After said step of providing the desired lens contour 50, the determining method may also comprise a step of determining one point in the desired lens contour 50 where the thickness of the complementary optical element 12 along the thickness axis Z has the minimum value within said desired lens contour 50. In doing so, it possible to comply with the thickness threshold only by focusing on that point thereby greatly facilitating the optimizing step. When the complementary optical element 12 has to provide a positive spherical power, it is known that the minimum thickness is on the perimeter of said desired lens contour 50. In the same way, when the complementary optical element 12 has to provide a negative spherical power, the point where the thickness is minimum thickness is known and located at the optical center.

During the optimizing step 120, the distance d between the two characterizing surfaces 20 along the thickness axis Z is optimized so that the thickness of the complementary optical element 12 at said point reaches the thickness threshold while complying with the optical function of the ophthalmic lens 40.

Figure 4:
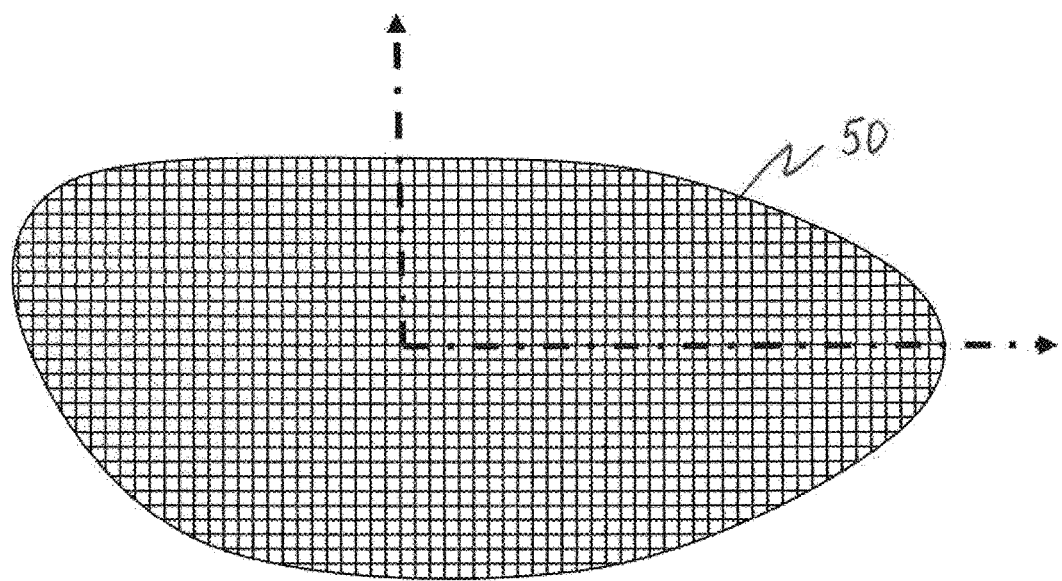
FIG. 4 schematically shows front and top views of a simulated complementary optical element using the determining method of FIG. 2.
Figure 4:
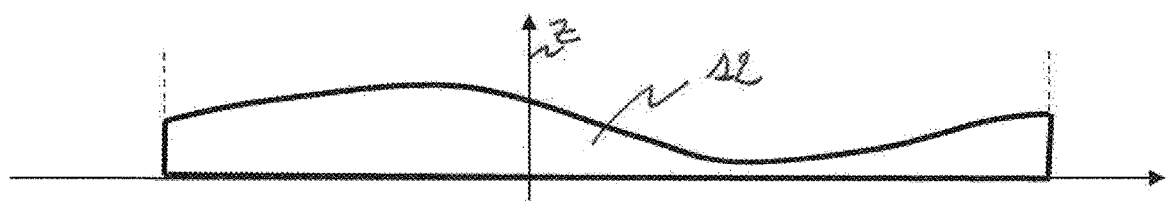

As in the example shown on FIG. 4, the point at which the thickness is minimum may not be known. To avoid any calculation of the thickness for every points in the desired lens contour 50, an iterative process may be performed. In other words, the optimizing step 120 may form a loop. As shown on FIG. 5, the optimizing step 120 may comprise a step of calculating 124 the optical function based on the desired lens contour 50. The optimizing step 120 may also comprise a first loop checking if the optical function criterion is fulfilled. The first loop preferably follows the calculating step 124. The first loop comprises a step of varying 126 the shape and/or position of at least one of the two characterizing surfaces 20 and a step of determining 127 if the optical function provided by the complementary optical element 12 is acceptable. The optimizing step 120 may further comprise a second loop checking if the thickness criterion is fulfilled. The second loop comprises a step of varying 128 the distance between the two characterizing surfaces 20 and a step of determining 129 if the thickness of the complementary optical element 12 has reached the thickness threshold. This second loop is repeated until the thickness threshold is reached. In the example shown on FIG. 5, the first loop is included in the second loop so that the optical function criterion is checked before the thickness criterion. In other words, the second loop is performed when the first loop is fulfilled, i.e. that the optical function criterion is fulfilled. When the first and second loops are fulfilled, the optimized distance d may be determined. The determining step 130 is then performed to determine said at least one parameter of the ophthalmic lens on the basis of said optimized distanced.

The optimizing step 120 may be started with a thick complementary optical element 12 so that it covers all the surface that is delimited by the desired lens contour 50. Then, thickness is reduced on at least one point any where inside the desired lens contour 50 while including it. Alternatively, the optimizing step 120 may start from a minimal thickness on one point inside the lens contour 50. Then, thickness is increased progressively while recalculating the external surface so as to fulfill the first and second loops.

Alternatively, the optimizing step 120 may comprise only one among the first and second loops. Furthermore, the optimizing step 120 may comprise an initial step of determining 122 said two characterizing surfaces 20 depending on measurements taken on a user or on at least one picture of the user.

An additional step of gluing may be also provided in which a gluing element or an adhesive having adhesion properties is provided to or comprised in the complementary optical element 12 and/or the starting optical system 30. In the first case, this gluing element may be a gluing layer disposed between two layers of the ophthalmic lens 40. Polymer jetting technology is preferred to deposit the glue layer on a selected area. Most preferably, the same equipment is used for manufacturing the glue layer and the complementary optical element 12. Another advantage of polymer jetting technology is that additive manufacturing machine can have multiple printing heads with various materials. The glue layer may also be deposited by spin or spray coatings. Particularly, spin coating is preferred when deposited onto the starting optical system 30 and spray coating is preferred when deposited onto the build support 10. These spin and spray coatings are specifically interesting to deposit a pressure sensitive adhesive. Other gluing technologies can be used as roll-to-roll, bar-coating or flow coating.

The gluing element may be chosen to be activated with light, by thermal curing or by pression.

When the activation is made by ultraviolet light, at least one among the build support 10, the complementary optical element 12 and the starting optical system 30 is at least partially transparent to the activation wavelength.

When the activation is made by thermal curing, the curing temperature is preferably below the glass transition of the build support 10, the complementary optical element 12 and the starting optical system 30 to avoid lens distortion. Thermal activation is preferably used when thermal expansion of the build support 10, the complementary optical element 12 and the starting optical system 30 are close to each other.

When the activation is made by pression, the gluing element is a pressure-sensitive adhesive (PSA) that is preferably at least one of the material of the build support 10.

In case of light or thermal curing activation, the gluing element may be a polymer resin used for manufacturing the complementary optical element 12.

An additional step of edging may be performed to edge the substrate before adding the complementary optical element 12. This is particularly advantageous in case of important risks of delamination during edging step. It can also help the alignment of the complementary optical element 12 on the starting optical system 30. Alternatively, the edging step may be performed after adding the complementary optical element 12.

The invention claimed is:

1. A computer-implemented method of determining at least one parameter of an ophthalmic lens to obtain a simulated complementary optical element of said ophthalmic lens, the ophthalmic lens including a starting optical system and a complementary optical element intended to be disposed onto the starting optical system, the complementary optical element being obtained by additive manufacturing and configured to provide at least a part of an optical function of the ophthalmic lens, the computer-implemented determining method comprising:

a step of providing two characterizing surfaces simulating two opposite surfaces of the complementary optical element, a thickness axis of the complementary optical element being defined perpendicular to one of the two characterizing surfaces, a distance between the two characterizing surfaces along said thickness axis defining a thickness of the complementary optical element;

a step of optimizing the distance between the two characterizing surfaces along the thickness axis so that the thickness of the complementary optical element reaches a thickness threshold depending on a thickness of volume elements that form the complementary optical element, to reduce the number and the thickness of the layers forming the complementary optical element while complying with the optical function of the ophthalmic lens; and a step of determining at least one parameter of the ophthalmic lens based on said optimized distance to obtain a simulated complementary optical element, said at least one parameter being one among a shape, a position, and an orientation of at least one of said two characterizing surfaces at a single point or at multiple points of said two characterizing surfaces.

2. The determining method according to claim 1, further comprising:

a step of providing a desired lens contour; and a step of determining one point in the desired lens contour where the thickness of the complementary optical element along the thickness axis has a minimum value within said contour, wherein, during the optimizing step, the distance between the two characterizing surfaces along the thickness axis is optimized so that the thickness of the complementary optical element at said point reaches the thickness threshold while complying with the optical function of the ophthalmic lens.

3. The determining method according to claim 2, wherein the ophthalmic lens is configured to be mounted within an opening of a frame, the desired lens contour being defined to match the opening.

4. The determining method according to claim 2, wherein the ophthalmic lens is configured to be mounted in an opening of a frame, the desired lens contour being defined to be larger than the opening.

5. The determining method according to claim 1, wherein one of the two characterizing surfaces defines an outer surface of the starting optical system on which the complementary optical element is intended to be deposited, the other characterizing surface defining an external boundary surface of the complementary optical element.

6. The determining method according to claim 1, wherein the optimizing step comprises a loop, including the substeps of:

varying the distance between the two characterizing surfaces, and determining if the thickness of the complementary optical element has reached the thickness threshold, the loop being repeated until the thickness threshold is reached.

7. The determining method according to claim 1, wherein the thickness threshold is a thickness range, the optimizing step comprising a step of determining if the thickness of the complementary optical element is within the thickness range.

8. The determining method according to claim 7, wherein the thickness range is set between 0 µm and 150 µm.

9. The determining method according to claim 1, further comprising:

a step of determining said two characterizing surfaces depending on measurements taken on a user or on at least one picture of the user.

10. A method of manufacturing an ophthalmic lens having at least one optical function, comprising:

a step of determining at least one parameter of the ophthalmic lens according to the method of claim 1; and a step of additively manufacturing the complementary optical element according to the at least one determined parameter with an optimized thickness by depositing a plurality of predetermined volume elements on a predetermined build support, the complementary optical element being configured to provide at least a part of the optical function of the ophthalmic lens.

11. The manufacturing method according to claim 10, wherein the additively manufacturing step to manufacture the complementary optical element is one among polymer jetting and stereolithography.

12. The manufacturing method according to claim 10, wherein the build support is a starting optical system.

13. The manufacturing method according to claim 10, further comprising:

a step of assembling the complementary optical element to a starting optical system to obtain the ophthalmic lens.

14. An ophthalmic lens having at least one optical function, the ophthalmic lens being obtained by the manufacturing method according to claim 10, the ophthalmic lens comprising:

a starting optical system; and a complementary optical element onto a surface of the starting optical system, the complementary optical element providing at least a part of the optical function of the ophthalmic lens, wherein the complementary optical element is obtained by additive manufacturing by depositing a plurality of predetermined volume elements on a predetermined build support, and wherein the complementary optical element has at least one area having an optimized thickness value below or equal to 150 µm.

15. The ophthalmic lens according to claim 14, wherein the starting optical system comprises a first surface configured to face an eye of a user when the ophthalmic lens is mounted on a frame worn by the user, and a second surface opposite to the first surface, the complementary optical element being disposed on either the first or the second surfaces of the starting optical system.

16. The determining method according to claim 7, wherein the thickness range is set between 10 µm and 100 µm.

17. The determining method according to claim 7, wherein the thickness range is set between 20 μm and 50 μm.

18. The ophthalmic lens according to claim 14, wherein the optimized thickness value of the at least one area is below or equal to 100 μm.

19. The ophthalmic lens according to claim 14, wherein the optimized thickness value of the at least one area is below or equal to 50 μm.

* * * * *